Jan. 6, 1970  D. S. ROSS ET AL  3,488,690
ARTIFICIAL KIDNEY MEMBRANE SUPPORT MEANS
Filed Oct. 11, 1967

INVENTORS
DONALD SUTHERLAND ROSS
WILLIAM McCLEMENTS MUIR
By Jacobs & Jacobs

United States Patent Office 3,488,690
Patented Jan. 6, 1970

3,488,690
ARTIFICIAL KIDNEY MEMBRANE SUPPORT MEANS
Donald Sutherland Ross, Bishopbriggs, and William McClements Muir, Rhu, Scotland, assignors to National Research Development Corporation, London, England, a corporation of Great Britain
Filed Oct. 11, 1967, Ser. No. 674,521
Claims priority, application Great Britain, Oct. 12, 1966, 45,611/66
Int. Cl. B01d 13/00
U.S. Cl. 210—321          7 Claims

ABSTRACT OF THE DISCLOSURE

A plate dialyser of the Kiil kidney type is adapted for use with mechanically weak membranes by using wire mesh supports for the membrane in place of the conventional V-grooving in the plate face. The preferred support is a woven stainless steel partly impressed in a porous compress of stainless steel filaments.

---

Figure 1:
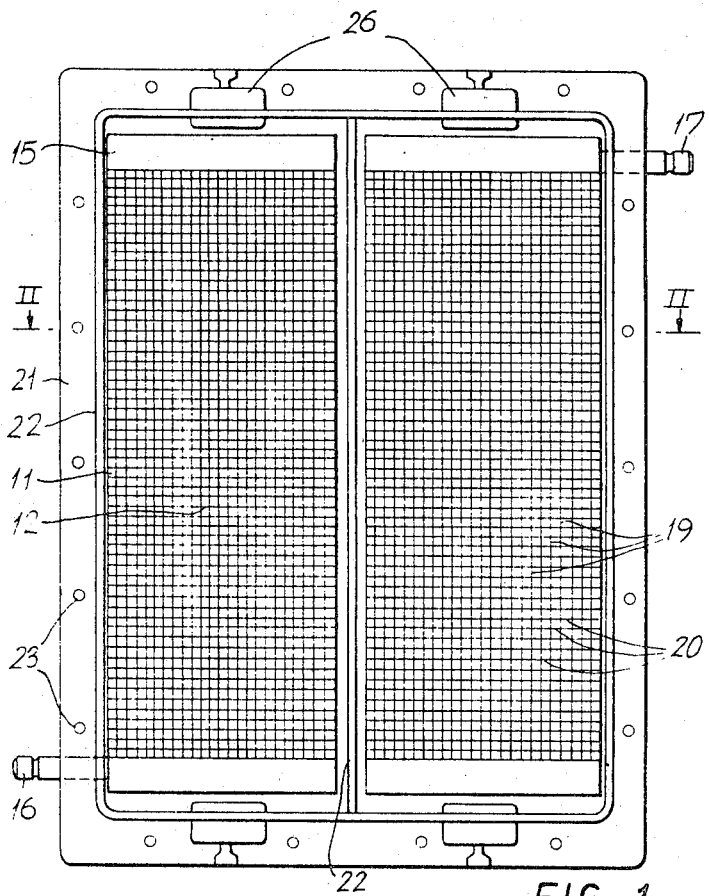

This invention relates to improvements in the design of plate dialysers, particularly plate haemodialysers that can be used in the treatment of patients suffering from renal failure.

The plate haemodialyser most customarily used at the moment in clinical practice is the Kiil kidney, named after its designer Frederick Kiil. The Kiil kidney when used clinically is normally in the form of three rigid plastic plates, 38.2″ x 13.5″ or 97 cm. x 34 cm., which are designed to be clamped together face to face in a three layer sandwich construction. The dialysing membrane used at present is a regenerated cellulose (usually "Cuprophane" or "Cellophane") which is inserted in the form of two sheets between each pair of plastic plates. The facing surfaces of the plastic plates have a series of surface grooves or depressions which in plan view are parallel to each other and to the longitudinal axis of the plate and in cross-sectional view are V-shaped. The parallel grooves are usually positioned so that the distance between the centres of adjacent grooves is of the same order as the average width of the groove. The asperities of the grooved portion of surface are at the same level as the surrounding ungrooved portion. Several sealing arrangements are available, one of which is a sealing ring which encircles the whole of the grooved portion. When two plates are clamped together, an air-tight seal can be formed by the sealing ring which is clamped against the ungrooved portion of the other plate. In this position the grooved portions on each plate are spaced apart slightly by the thickness of two sheets of membrane. The dialysing membrane is clamped between the plates prior to use and the pressure of the air-tight seal all round on the double membrane seals the edges of the membrane which is thus able to enclose a liquid-tight zone through which blood can pass. Each membrane envelope thus formed is provided with one inlet and one outlet port so that blood can be passed from the patient through the dialysing zone and back to the patient. Thus associated with each outer membrane surface is a space enclosed by the membrane sheet and the grooved surface of a plate which forms a passage for dialysing fluid. It is normally arranged so that the dialysing fluid passes through the kidney in co- or counter current to the direction of the blood flow.

The dialysing fluid is pumped through the kidney at such a pressure that the blood can flow through in co- or counter current unimpeded under the action of the patient's heart, avoiding the need for a blood pump.

A clinical practice has built up whereby patients requring treatment with Kiil kidney are dialysed for 10 to 14 hours continuously, conveniently overnight, about two or three times a week depending on the individual requirements. In order that the treatment may be carried out in a clinically convenient way and the equipment, of which the Kiil kidney forms only a part, used most economically, the Kiil kidneys are usually produced in the triple layer construction to provide a total area of dialysing membrane of about twelve square feet. This necessitates the use of physically large plates which are quite heavy with the associated clamping bars and may require two people to assemble the kidney with the membranes in position.

The undesirably large size of the Kiil kidney is attributable in part to the fact that the cellulose membranes now in use are not ideal as semi-permeable membranes for haemodialysers because the transport rate of certain impurities across the membrane is slow so that a large area of membrane must be made available. Cellulose membranes however are mechanically quite strong, and this is most important as the membrane is subjected to substantial pressure when haemodialysis takes place. The requirement of large membrane areas to dialyse small quantities of certain blood poisons has provoked a search for alternative membranes having a clinically acceptable combination of chemical and physical properties.

Many of the alternative membranes that have been examined in an attempt to speed up transport through the film during dialysis have different elastic properties or are inherently weaker mechanically than the cellulose membranes now used. Mechanical support afforded by the conventional V-groove pattern of the Kiil kidney plates is often inadequate for or missuited to these mechanically weak membranes. An alternative membrane support system has now been devised which gives better mechanical support to the membrane than the conventional V-groove pattern without occluding an undesirably high proportion of the total membrane area.

The present invention provides a plate dialyser having two end members adapted to be secured together with a dialysing membrane located between them to form a zone through which flows blood or other liquid to be dialysed and a zone through which flows the dialysate liquid, the zones being separated from each other by the membrane and each zone having inlet and outlet ports; the face adjacent to the membrane on at least one end member being a porous body of interconnected filaments which can act as a support for the membrane.

The porous face to support the membrane is preferably of a substantially regular woven character, for example it may include two series of parallel wire-like filaments, each series perpendicular to the other. These wire-like filaments may be interwoven with each other in a conventional woven pattern leaving spaces between adjacent filaments in the parallel series. In this way, a relatively inflexible porous body can be constructed for flexible wires or filaments and the spacing apart of the wires or filaments can be adapted to the mechanical strength of the membrane to be used. This additional support to the membrane can be given by increasing the number of wires or filaments per unit length of the network or by increasing the thickness or gauge of the wires or filaments or by a combination of both.

Where the wires or filaments are interwoven in a conventional manner at relatively close centres, the network as a whole may be sufficiently tight to prevent any sideways movement of the individual wires or filaments. When the wires or filaments are spaced further apart or perhaps not actually interwoven but merely laid on top of each other, it becomes necessary to affix the wires or filaments to each other at their points of contact or at their ends. The actual method depends largely on the chemical nature of the wire or filament and could be fused, welded, compressed, fixed with an adhesive, etc. Alternatively, the support may be wound from a continuous wire or filament using a suitable former. A further possible support is a perforated sheet of substantially regular perforations.

The porous body, like the rest of the dialyser, must be constructed from a clinically acceptable material if it is to be used in extra-corporeal haemodialysers and sterilisable plastic materials such as nylon and polypropylene, which can be drawn into fibres or filaments, may be used. Certain metals are also suitable provided they can withstand the corrosive effect of the dialysate fluid which circulates over and through the porous body. 18/8 stainless steel is one suitable metal and can readily be fabricated from wire strands into the desired porous membrane support. A woven stainless steel mesh formed from wire strands (30 gauge, 16 per inch, 0.012" diameter) represents a preferred membrane support. A more substantial support could be formed using wire strands of 28 gauge wire, 0.0148" diameter, 12 per inch.

In operation, because of the pressure differential between the blood on the one side and the dialysing liquid on the other, the membrane tends to stretch outwardly into the dialysate zone through the spaces in the porous membrane support. This membrane stretching is desirable as it increases the area of membrane available for dialysis. However, the membranes for which the support means of the invention has been designed are those which are mechanically weaker than existing cellulose membranes and it is often necessary to restrict the extent to which stretching of the membrane can take place.

In one embodiment of the invention, the dialysing liquid zone is filled, in operation, with the liquid and the porous membrane support, preferably the woven network or mesh is secured in the zone adjacent to the membrane. In a further embodiment for extra membrane support, the porous body of interconnected filaments is carried on a further porous support, e.g. a compress of filaments, swarf, powder or similar particles. This additional support may be necessary where the primary support is a woven network of a relatively open character and the additional support may conveniently be constructed of similar material but having a greater "bulk density" and hence lower porosity than the primary support. A woven network of strainless steel wires may be impressed into the surface of a compressed stainless steel swarf or powder having an open area of 20–60%. In such a case, the wires in the network stand out slightly from the surface of the compress and act as the primary membrane support while the compress itself acts as a secondary support. When a primary and secondary membrane support of this type is used the porous mass may fill the whole of the dialysing liquid zone and the interconnected porous system then provides the passageways between the inlet and outlet ports for the dialysing liquid. A further possible porous support is a corrugated perforated sheet.

The novel membrane support of the invention is preferably used in an artificial kidney of the Kiil type, that is to say, a rigid plate dialyser having two or more plates and a blood envelope formed from a double dialysing membrane between each pair of plates. In such a case, each plate face adjacent to a membrane presents the novel membrane support. A particular type of blood envelope which may be used in combination with the novel membrane support is a cassette having an open impermeable framework closed by the two membranes which are spaced apart from each other by the framework.

The invention has been discussed above in relation to artificial kidneys but it will be apparent that the principle described will be applicable to plate dialysers to be used for any purpose as the problems of providing adequate support for a dialysing membrane and adequate access of dialysing liquid to the membrane are similar in nature regardless of the purpose for which dialysis is carried out.

Figure 2:
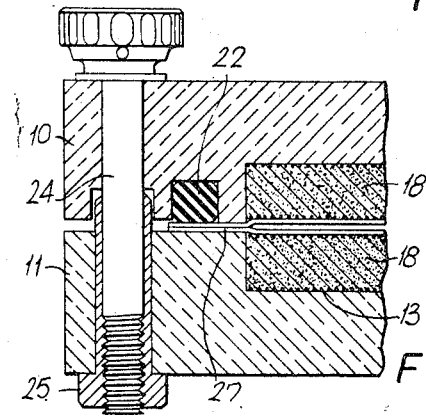

A specific embodiment of the invention will now be described with reference to the accompanying drawings in which:

FIGURE 1 shows a plan view of the bottom plate of a two plate haemodialyser; and FIGURE 2 shows a cross-sectional view taken on II—II of FIGURE 1 but showing the two plates fixed together with a double membrane between them.

The haemodialyser comprises generally a top plate 10 and bottom plate 11 of which plate 11 only is shown in FIGURE 1. Plate 11 acts as a framework carrier for the wire mesh membrane support 12 which is located in a recess 13 in plate 11, recess 13 has exactly the same width as wire mesh support 12 but the length of the recess is longer than wire mesh support 12 and the depth of the recess is greater than the thickness of the support. This additional length is utilised as channels 14 and 15 which run the full width of wire mesh support 12 and provide dialysate reservoirs, having inlet port 16 and outlet port 17, to regulate the flow of dialysate liquid through the haemodialyser. The additional depth allows for the spacing apart of the membranes when the dialyser is in use.

Wire mesh membrane support 12 is formed from a compressed stainless steel swarf 18 into which is impressed on both sides an interwoven, symmetrical mesh of stainless steel wires made up of two series of parallel wires 19 and 20, the series being perpendicular to each other, the wires being approximately 17 to the inch and about 0.008" diameter. This wire mesh support is quite rigid but is porous and has an open area of about 20–40%.

A surrounding portion and central section 21 of plate 11 is fitted with O-ring 22, aperture at 23 to receive bolts 24 passing through top plate 10, which are secured with bush nuts 25. Central section 21 divides the plates symmetrically to provide two recess areas 13. Surround portion 21 is recessed at 26 to receive blood inlets and outlets (not shown) which lead to and from the interior of the double membrane 27.

Top plate 10 is identical to bottom plate 11 except that O-ring 22 is omitted and bolts 24 pass through apertures in the top plate in line with apertures 23 in the bottom plate when the two plates are held in the assembled position.

The haemodialyser is assembled and operated in essentially the same way as a Kiil kidney. Briefly, this involves laying two membranes 27 on top of the bottom plate 11 so that it extends beyond O-ring 22 but not as far as the clamping bolts 24. Blood inlet and outlet ports are located in recesses 26 to communicate with the interior of the double membrane blood envelope. Top plate 10 is then fitted into position and the bolts 24 screwed down by hand to clamp the double membrane 27 between the plates, the O-ring 22 making a liquid tight seal around the blood envelope and the two dialysing liquid zones located on either side of the double membrane. Blood and dialysing liquid are then caused to flow through the dialyser in co- or counter current in the usual manner.

We claim:

1. A haemodialyser having plate members adapted to be secured together to retain between them a dialysis membrane so as to form a blood chamber and a dialysate chamber on opposite sides of the membrane and having membrane supporting means in the dialysate chamber comprising a primary support member which is a metallic network or perforated structure and a secondary support member which is a compress of metallic filamentary material or swarf having an open area of from 20–60%.

2. A haemodialyser according to claim 1 in which the primary support member is a perforated metal sheet.

3. A haemodialyser according to claim 1 in which the primary support is partly impressed into the surface of the secondary support.

4. A haemodialyser according to claim 1 in which each plate member is recessed to receive the membrane supporting means whereby exterior support to a double dialysing membrane constituting a blood envelope is provided.

5. A haemodialyser according to claim 1 in which the primary support member is a network of interwoven metal wires affixed one to the other at their points of contact.

6. A haemodialyser according to claim 5 in which the primary support member is a woven stainless steel mesh.

7. A haemodialyser comprising a pair of plate members adapted to be secured together, a dialysis membrane in the form of an envelope the interior of which constitutes a blood chamber disposed between said plate members, each plate member having a recess communicating with the exterior of said envelope so as to provide a dialysate chamber communicating with each exterior surface of the membrane and comprising a membrane supporting means located in and filling substantially the whole of said dialysate chamber, said membrane supporting means comprising a metallic network or perforated sheet disposed at the open end of said recess and constituting a primary support for the membrane and a compress of metallic filamentary material or swarf having an open area of from 20–60% located within said recess and constituting a secondary support member in contact with said primary support member.

References Cited

UNITED STATES PATENTS

| | | | |
|---|---|---|---|
| 2,683,117 | 7/1954 | Rosenak et al. | 210—321 |
| 2,686,154 | 8/1954 | MacNeill | 210—321 |
| 2,711,828 | 6/1955 | Webb et al. | 210—489 |
| 2,880,501 | 4/1959 | Metz | 29—450 |
| 3,212,642 | 10/1965 | Kylstra | 210—321 |
| 3,266,629 | 8/1966 | Megibow | 210—321 |
| 3,398,091 | 8/1968 | Greatorex | 210—321 X |

OTHER REFERENCES

Babb et al.: "A New Concept in Hemodialyzer Membrane Support," from the Trans. Amer. Soc. Artif. Int. Organs, vol. X, received in Patent Office June 25, 1964, pp. 31–37 relied on.

Crescenzi et al.: "Development of a Simplified Membrane Oxygenator," from Trans. Amer. Soc. Artif. Int. Organs, vol. 5, 1959, pp. 148–156 relied on.

Leonard: "Engineering In Medicine: Design of an Artificial Kidney," presented at a meeting of the Division of Engineering, N.Y. Academy of Sciences, Apr. 17, 1959, pp. 585–598 relied on.

REUBEN FRIEDMAN, Primary Examiner

F. A. SPEAR, JR., Assistant Examiner

U.S. Cl. X.R.

210—541